United States Patent [19]

Mitsuishi et al.

[11] 4,270,308
[45] Jun. 2, 1981

[54] GREENHOUSE

[75] Inventors: Yukio Mitsuishi, Machida; Shigeru Shiozaki; Kinji Hasegawa, both of Sagamihara, all of Japan

[73] Assignee: Teijin Limited, Osaka, Japan

[21] Appl. No.: 17,538

[22] Filed: Mar. 5, 1979

Related U.S. Application Data

[63] Continuation of Ser. No. 820,033, Jul. 28, 1977, abandoned, which is a continuation of Ser. No. 616,899, Sep. 25, 1975, abandoned.

[30] Foreign Application Priority Data

| Sep. 27, 1974 | [JP] | Japan | 49/110428 |
| Dec. 23, 1974 | [JP] | Japan | 49/146713 |
| Jan. 28, 1975 | [JP] | Japan | 50/10953 |
| Feb. 12, 1975 | [JP] | Japan | 50/16919 |
| Mar. 5, 1975 | [JP] | Japan | 50/26053 |
| Apr. 16, 1975 | [JP] | Japan | 50/45125 |
| Jul. 1, 1975 | [JP] | Japan | 50/80484 |

[51] Int. Cl.³ .................................................. B29C 25/00
[52] U.S. Cl. .................................... 47/17; 264/235.8; 264/DIG. 73
[58] Field of Search ........ 47/17, 29, DIG. 7, DIG. 6; 264/216, 288.4, 290.2; 427/171, 173, 178; 264/DIG. 73, 235.8

[56] References Cited

U.S. PATENT DOCUMENTS

| 2,823,421 | 2/1958 | Scarlett | 264/216 |
| 2,923,966 | 2/1960 | Tooke, Jr. et al. | 264/DIG. 73 |
| 2,928,132 | 3/1960 | Richards, Jr. | 264/235.8 |
| 2,952,879 | 9/1960 | Kitson et al. | 264/DIG. 73 |
| 2,968,065 | 1/1961 | Gronholz | 264/235.8 |
| 2,968,067 | 1/1961 | Long | 427/173 X |
| 2,975,484 | 3/1961 | Amborski et al. | 264/DIG. 73 |
| 3,043,709 | 7/1962 | Amborski | 427/173 X |
| 3,165,499 | 1/1965 | Alles | 264/235.8 |
| 3,223,764 | 12/1965 | Kahn et al. | 264/290.2 X |
| 3,256,379 | 6/1966 | Heffelfinger | 264/290.2 X |
| 3,257,489 | 6/1966 | Heffelfinger | 264/290.2 |
| 3,271,495 | 9/1966 | Gronholz | 264/290.2 X |
| 3,375,831 | 4/1968 | Serbus | 52/63 X |
| 3,407,112 | 10/1968 | Karickhoff | 428/220 |
| 3,429,961 | 2/1969 | Spencer | 264/290.2 X |
| 3,432,591 | 3/1969 | Heffelfinger | 427/171 X |
| 3,453,786 | 7/1969 | Rebarchek | 52/63 |
| 3,531,899 | 10/1970 | Bartlett | 47/17 X |
| 3,627,579 | 12/1971 | Heffelfinger | 264/290.2 X |
| 3,627,625 | 12/1971 | Jarrett | 264/290.2 X |
| 3,786,127 | 1/1974 | Peet et al. | 264/288.4 |
| 3,816,886 | 6/1974 | Van Cappellen | 264/288.4 X |
| 3,875,119 | 4/1975 | Aoki et al. | 264/235.8 |
| 3,944,644 | 3/1976 | Van Cappellen | 264/DIG. 73 |
| 4,055,030 | 10/1977 | Earnshaw | 52/222 |
| 4,072,779 | 2/1978 | Knox et al. | 264/290.2 X |
| 4,134,957 | 1/1979 | Yoshimura | 264/288.4 |

FOREIGN PATENT DOCUMENTS

| 703608 | 2/1965 | Canada | 264/235.8 |
| 1569591 | 5/1969 | Fed. Rep. of Germany | 260/96 R |
| 1937998 | 2/1970 | Fed. Rep. of Germany | 52/309 |
| 7004891 | 10/1970 | Netherlands | 47/17 |

*Primary Examiner*—E. H. Eickholt
*Attorney, Agent, or Firm*—Wenderoth, Lind & Ponack

[57] ABSTRACT

A greenhouse constructed by stretching over a framework a polyethylene terephthalate film oriented in at least one direction and having a refractive index in the oriented direction of 1.57 to 1.78, a refractive index in the thickness direction of 1.48 to 1.57, a density of 1.340 to 1.390 g/cm³, and a thickness of 50 to 500 microns, as a material for protecting plants from weather exposure.

1 Claim, 1 Drawing Figure

FIG. 1

GREENHOUSE

This application is a continuation of application Ser. No. 820,033, filed July 28, 1977, which is a continuation application of Ser. No. 616,899, filed Sept. 25, 1975, both now abandoned.

This invention relates to an improvement of a greenhouse constructed by using a plastic film as a material for protecting plants from weather exposure, and more specifically, to a novel greenhouse constructed by stretching over a framework a polyethylene terephthalate film having specific properties as a material for protecting plants from weather exposure.

Films stretched over a greenhouse framework are desired to have superior mechanical properties, especially high break strength and elongation, must undergo little deterioration in mechanical properties following long outdoor exposure, and should permit good transmission of sunlight required for the growth of plants (light rays in the visible to ultaviolet wavelength regions). The use of a large amount of an ultraviolet absorber for increasing the weatherability of the film is not desirable because such a film permits the transmission of reduced amounts of ultraviolet rays. Furthermore, when loosening occurs in the film stretched over the framework, there is increasing flutter and breakage of the film due to wind, rain, etc. Hence, the film is desired to be stretched in a completely taut state.

However, the imparting of weatherability to the film is inconsistent with the maintaining of the mechanical properties inherent to the film and the increasing of the ultraviolet ray transmittance of the film, and it is difficult to allow them to stand together. It is more difficult to stretch the film in a completely taut state to avoid loosening.

Polyvinyl chloride films have previously gained widespread acceptance as a material for protecting plants from weather exposure in constructing greenhouses, but because of their insufficient weatherability, they are degraded after use for relatively short periods of time and have deteriorated mechanical properties. Furthermore, the polyvinyl chloride films have a low degree of transparency because they contain an ultaviolet absorber, and coupled with the soiling of the films by the plasticizer that bleeds out during use for a long time, their transmittance of sunlight decreases.

Polyethylene terephthalate films, on the other hand, are known to have high crystallinity a high melting point, are superior properties such as thermal stability, chemical resistance, strength or elasticity, and have been widely used for magnetic tapes, photography, metallizing, packaging, electrical uses, and agriculture. Ordinary polyethylene terephthalate films, however, have unsatisfactory weatherability, and when exposed outdoors for long periods of time, they deteriorate markedly in mechanical properties. In order to improve their weatherability, attempts have been made to incorporate thereinto an ultaviolet absorber or coat their surface with it. But unless the ultraviolet absorber is used in such a large quantity as to impair the mechanical properties of the film, it is impossible to impart weatherability good enough to render the film sufficiently resistant to long outdoor exposure.

It is an object of this invention to provide a greenhouse using a film which can overcome the above-mentioned difficulties, which has superior transparency and good transmissibility of ultraviolet rays, and which, when stretched over a greenhouse framework, is not loosened nor does it undergo flutter or breakage by wind or rain.

Other objects of this invention will become apparent from the following description.

The term "greenhouse", as used in the present application, denotes a structure constructed by stretching a plastic film over a framework in which useful plants such as vegetables, flowers, fruit or nut trees, rice plants or tobaccoes are grown or stored while protecting them from weather exposure, and includes, for example, hothouses, tunnels, silos, and mulches.

We have found that these objects can be obtained by using a polyethylene terephthalate film oriented in at least one direction and having (1) a refractive index in the oriented direction of 1.57 to 1.78, preferably 1.59 to 1.75, more preferably 1.61 to 1.72, (2) a refractive index in the thickness direction of 1.48 to 1.57, preferably 1.485 to 1.56, more preferably 1.49 to 1.55, (3) a density of 1.340 to 1.390 g/cm$^3$, preferably 1.350 to 1.382 g/cm$^3$, more preferably 1.355 to 1.379 g/cm$^2$, and (4) a thickness of 50 to 500 microns, preferably 75 to 400 microns, more preferably 100 to 350 microns.

Thus, according to this invention, there is provided a greenhouse constructed by stretching such a polyethylene terephthalate film over a framework as a material for protecting plants from weather exposure.

In a preferred embodiment of the present invention, the polyethylene terephthalate film further has the property of shrinking at least 4% in at least one direction thereof (therefore, in only one or in two directions, but preferably in two directions) when it is exposed in the relaxed state to hot air at 120° C. for 1 minute. Films having a shrinkage, as defined above, of at least 4%, after having been stretched over a framework, gradually shrink as they are exposed to sunlight and become free from loosening, and therefore, they can be stretched over the frame in a completely taut state. However, films having a shrinkage of less than 4% exhibit only a low degree of such a effect. Films having a shrinkage of at least 10% are especially preferred in the present invention.

The polyethylene terephthalate films used in this invention can be prepared by any desired methods. For example, they can be prepared by stretching an unstretched film of polyethylene terephthalate having an intrinsic viscosity, as measured in an o-chlorophenol solution at 35° C., of 0.4 to 1.0, preferably 0.6 to 0.95, and more preferably 0.7 to 0.9 and melt-extruded at an ordinary extruding temperature (260° to 330° C.), in one direction to 2.5 to 5.0 times, preferably 3.0 to 4.5 times, the original dimension at a temperature which affords a refractive index ($n_{SD}$) in a direction at right angles to the stretching direction of not more than 1.560 after the stretching, then, if required, stretching it in a direction at right angles to the first stretching direction (if the first stretching direction is a machine direction, then the second stretching direction is a transverse direction) to 2.5 to 5.0 times (stretch ratio), preferably 3.0 to 4.5 times at 50° to 80° C., and heat-setting the resulting monoaxially or biaxially oriented film at 80° to 150° C. for 1 to 100 seconds. Polyethylene terephthalate films in accordance with this invention which are prepared by the above method from unstretched films having an intrinsic viscosity of 0.6 to 0.95 are especially useful in the present invention because they are resistant to crystallization and therefore have a low haze value, and are superior in transparency and break or tear strength and elongation. Films prepared by the above method from polyethylene terephthalate having an intrinsic viscosity of less than 0.6 tend to show a high breakage frequency when stretched at relatively low temperatures.

When the stretching temperature at the first stretching is elevated, the refractive index ($n_{SD}$) of the film tends to increase. Accordingly, the upper limit to the first stretching temperature is one which affords a refractive index of 1.560 after the monoaxial stretching. The lower limit to the stretching temperature is the lowest stretching temperature at which a markedly great non-uniformity in thickness ascribable to the mingling of the unstretched portion and the high stretched portion does not occur. The stretching temperature which affords a refractive index of 1.560 differs somewhat according to the type of the polymer or the stretch ratio, but usually, it is about 5° to 10° C. higher than the above lower limit of the stretching temperature.

One advantage common to all embodiments of the invention is that the polyethylene terephthalate film used has weatherability which is expressed by the fact that after having been exposed for 100 hours to a high pressure mercury lamp having 365 Nm as the strongest spectrum, the film has a break elongation in at least one direction thereof of at least 10%, preferably at least 15%, more preferably at least 25%. This will be demonstrated by Examples to be given hereinbelow.

Although we are not limited by any theory, the superior weatherability of the polyethylene terephthalate film used in this invention is presumably because the film has such a low density as 1.340 to 1.390 g/cm³. Since the polyethylene terephthalate film used in this invention has a low density, its crystal size and long period are both small. It has a crystal size in the direction of 010 plane of 15 to 45 A, preferably 15 to 40 A, a crystal size in the direction of 100 plane of 20 to 55 A, preferably 20 to 45 A, and a long period of 100 to 140 A, preferably 100 to 135 A. In such a low density polyethylene terephthalate film in accordance with this invention, the number of tie-molecules connecting the crystals from one another is overwhelmingly larger than that in ordinary high density polyethylene terephthalate films having a large crystal size and a great long period. Let us assume that the cleavage of molecules occurs with the same probability with regard to the same length of molecule when both of these films are exposed to sunlight under the same conditions. Then, it follows that the number of tie-molecules remaining uncleaved is larger in the low density polyethylene terephthalate film used in the present invention than in the ordinary high density polyethylene terephthalate films. The larger number of remaining tie-molecules means that tension between molecules is maintained higher, and in other words, the weatherability of the film is better.

The polyethylene terephthalate used in this invention includes not only polyethylene terephthalate as a homopolymer, but also a copolyethylene terephthalate consisting of at least 85% of ethylene terephthalate recurring units and the remainder being another unit, and a polymer blend consisting of at least 85% by weight, preferably at least 90% by weight, of polyethylene terephthalate and not more than 15% by weight, preferably not more than 10% by weight, of another polymer. Examples of the other polymer that can be blended are polyamides, polyolefins, and other types of polyesters. If desired, the polyethylene terephthalate may contain lubricants, delusterants, coloring agents, stabilizers, antioxidants, antistatic agents, etc. The addition of an ultraviolet absorbent brings about a favorable result to the present invention.

Films in accordance with this invention prepared by the above method from polyethylene terephthalate containing 0.01 to 0.07% by weight of antimony (as metallic antimony) have superior resistance to heat deterioration and dustproofness as well as excellent weatherability. Accordingly, these films have a high utilitarian value as a material for constructing greenhouses. These films can withstand use for long periods of time (for example, about 20 months or more) while being exposed to sunlight, wind, rain, etc., and undergo little deterioration when exposed to high temperatures for example, when exposed outdoors in contact with metal such as the greenhouse framework. Furthermore, since in outdoor use in a stretched state the contamination of the film by the dust which builds up on the surface of the gradually deteriorated film is reduced, such a film has the advantage that washing of its surface for restoring its decreased light transmission can be saved.

Films containing less than 0.01% by weight of antimony have a large initial light transmittance, but tend to have insufficient dustproofness, and films containing more than 0.07% by weight of antimony are blackish in color and tend to have insufficient initial light transmittance and resistance to heat deterioration. The more preferred amount of antimony is 0.02 to 0.06% by weight.

Antimony may be incorporated into the polyester film in the form of either a metal or a compound. Preferably, however, it is contained as dissolved in polyethylene terephthalate (antimony salts can assume such a state). Accordingly, although metallic antimony and antimony trioxide can be used, inorganic acid or organic acid salts of antimony, double salts of antimony (for example, potassium antimony tartrate), and salts of antimonic acid (for example, potassium pyroantimonate) are preferably used. Antimony acetate obtained by reacting antimony trioxide with acetic acid is one of those species which are especially preferred. When an antimony compound is added, the content of antimony in the polyethylene terephthalate is a value calculated as metallic antimony in the compound.

Antimony may be added to the polymer after polycondensation. It is preferred, however, to add it to a polymerforming material before polycondensation or to the reaction mixture during polycondensation so as to allow it to act also as a polycondensation catalyst. Accordingly, an antimony compound may be added to a material before an esterification reaction together with an ester-interchange catalyst, or to a bis($\beta$-hydroxyethyl) terephthalate melt.

Films in accordance with this invention prepared by the above method from polyethylene terephthalate containing a minor amount, for example, 0.05 to 10% by weight, preferably 0.1 to 5% by weight, of an ultraviolet absorber have especially superior weatherability when they meet the following equation $A/d \geq 25$ wherein A is the optical density of the film measured by a spectrophotometer, and d is the thickness of the film expressed in centimeters, in a wavelength region of ultraviolet rays (not more than 325 mµ).

The reason for this is not clear. Presumably, however, it is ascribed to the following. Films having an A/d of lower than 25(cm$^{-1}$) permit a good transmission of ultraviolet rays having a wavelength of not more than 325 mµ, and ultaviolet rays are absorbed uniformly in the thickness direction of the film. Therefore, the film is deteriorated throughout. In contrast, films having an A/d of greater than 25 (cm$^{-1}$) absorb ultraviolet rays of the above wavelength region almost completely at their surface. Hence, the interior of the film is less deteriorated, and the film as a whole exhibits superior weatherability. There is no particular upper limit to the A/d value, but since films having too high an A/d value tend to reject visible rays and ultraviolet rays having a wavelength larger than 325 mµ at the same time, the A/d value of the film is preferably not more than 5,000 (cm$^{-1}$), especially 50 to 2,500 (cm$^{-1}$).

As described hereinabove, polyethylene terephthalate films in accordance with this invention having an A/d value of at least 25 (cm$^{-1}$) have a low transmittance of ultraviolet rays having a wavelength of not more than 325 mµ. Ultaviolet rays having such short wavelengths tend to inhibit the growth of plants. But when the polyethylene terephthalate films in accordance with this invention are used for greenhouses, there can be obtained an effect of improving the growth of the plants in a low temperature period when their growth is slow.

Examples of the ultraviolet absorber used in this invention are benzophenone compounds such as 2,4-dihydroxybenzophenone, 2,2',4,4'-tetrahydroxybenzophenone, 2,2'-dihydroxy-4-methoxybenzophenone, 2-hydroxy-4-methoxy-2'-carboxybenzophenone, 2-hydroxy-4-n-octoxybenzophenone, 2-hydroxy-4-n-octoxy-4'-chlorobenzophenone, or 2-hydroxy-4-stearoxy-3',4'-dichlorobenzophenone; benzotriazole compounds such as 2-(2'-hydroxy-3'-tertiary butyl-5'-methylphenyl)-5-chlorobenzotriazole, 2-(2'-hydroxy-3',5'-ditertiary butylphenyl)-5-chlorobenzotriazole, 2-(2'-hydroxy-3'-tertiary butyl-5'-methylphenyl) benzotriazole, 2-(2'-hydroxy-3',5'-ditertiary butylphenyl) benzotriazole, 2-(2'-hydroxy-4-octoxy) benzotriazole, 2-(2'-hydroxy-3',5'-dineopentyl) benzotriazole, or 2-(2'-hydroxy-5'-methylphenyl) benzotriazole; salicylate compounds such as trimethylol propane trisalicylate, pentaerythritol tetrasalicylate, phenylethylene glycol disalicylate, or n-octyl-5-methyl salicylate. Of these, the benzophenone compounds are especially preferable.

If required, the greenhouse of this invention can be constructed by using a polyethylene terepthalate film having an anti-fog coating on at least one surface thereof, as a material for protecting plants from weather exposure. Such a greenhouse is free from any adverse effects, on the growth of plants, of the decrease of the light transmittance of the film which occurs as a result of evaporation of moisture within the house by the heat of the sun and its condensation as water drops on the film surface inside the house.

In order to form an anti-fog coating, a treating solution containing an anti-fogging agent is coated on the surface of the film. The anti-fogging agents may be any substances that are used for anti-fog coating of film surfaces. Examples of the anti-fogging agents usually employed are hydrophilic polymer such as polyesters obtained by polycondensing dibasic acids with polyethylene glycol; a mixture of an N-methoxymethylated nylon and a water-soluble and methoxymethylolated melamine; a mixture of an acrylate ester/hydroxyacrylate ester copolymer and a surface active agent; polyvinyl alcohol; and copolymers derived from α,β-unsaturated carboxylic acids (for example, maleic acid, fumaric acid, or itaconic acid), acrylic acid or methacrylic acid, and acrylic acid derivatives (for example, acrylate esters or acrylamide), methacrylic acid derivatives (for example, methacrylate esters, or methacrylamide), acrylonitrile, vinyl acetate, styrene or maleate esters.

If desired, the treating solution may further contain various additives such as a coat curing agent, hydrophilicity-controlling assistant, flow controlling agent, viscosity controlling agent, curing promotor, or neutralizing agent. The coat curing agent serves to improve the lasting property of the anti-fogging agent and the stability of its effect by curing the coating of the anti-fogging agent. Usually, 0.5 to 5% by weight, based on the anti-fogging agent, of a polyepoxide is added to the treating solution for this purpose. The hydrophilicity-controlling assistant serves to control the adhesiveness, cohesive force, plasticity, viscosity, coating hardness, etc. of the anti-fogging agent by moderately increasing or decreasing its hydrophilicity. Examples of the hydrophilicity-controlling assistant frequently used are oily or wax-type surface active agents (nonionic and anionic); water-soluble plasticizers such as polyester polyol, polyether polyol, or glycerol; polyacrylic acid; polyacrylamide; and inorganic electrolytes such as potassium acetate, ammonium acetate, potassium chloride or potassium rhodanate.

The concentration (solids content) of the anti-fogging agent in the treating solution is usually maintained at 0.01 to 5% by weight. Water, a water-miscible organic solvent, or a mixture of water and the water-miscible organic solvent is usually used as a solvent for preparing the treating solution. The treating solution may be coated on the film in any desired manner, and for example, a coating method using a gravure roll coater, air doctor, blade coater, kiss coater or meyer bar coater, a spray method, and a casting method can be used.

The preferred coating thickness (after drying) is about 0.01 to 100 microns. After coating the treating solution, the resulting coating may be dried spontaneously or by heating.

The greenhouse of this invention can be constructed by stretching the polyethylene terephthalate film mentioned above over a framework in a customary manner. The greenhouse of this invention is characteristic in that even when the film has loose portions immediately after stretching, the temperature of the film rises as it is exposed to sunlight, and with it, the film shrinks little by little, and after a short while, it becomes taut, and therefore, the film does not flutter nor break by usual wind or rain. In conventional greenhouses using polyvinyl chloride films, the loosening of the film at the time of stretching remains long, and frequently becomes a cause of the breakage of the film by wind and rain. In order to prevent this, there has been no way but to perform the stretching operation as carefully as possible. According to the present invention, however, the initial loosening of the film disappears during use, and therefore, stretching of the film over a framework can be done easily without consideration to the occurrence of loosening.

The following non-limitative Examples illustrate the present invention specifically.

The properties of the film shown in the following Examples were measured by the following methods.

(1) ELONGATION AT BREAK

A film specimen having a length of 10 cm and a width of 1 cm was pulled at a rate of 100%/min. in an atmosphere held at room temperature and a relative humidity of 65% using Tensilon UTM-III-500 (a product of Toyo Baldwin Company). A load-elongation chart of the specimen was prepared, and the degree of elongation of the specimen at breakage based on the original length was measured and expressed in percent.

(2) STRENGTH AT BREAK

In the above test (1), the force required to break the film was expressed by the force exerted on the film per unit cross-sectional area (Kg/mm$^2$).

(3) REFRACTIVE INDEX

The refractive index with regard to a D line of Na was measured at 25° C. using an Abbe's refractometer. Frequently, the refractive index varies in the widthwise direction of the film, but in the present application, the maximum value of the varying refractive indices was employed. The refractive index of the film in the machine direction (longitudinal direction) was designated as $n_x$; that in the transverse direction (widthwise direction), as $n_y$; and that in the thickness direction, as $n_z$.

(4) DENSITY

It was measured by a floating method at 25° C. in a mixture of n-heptane and carbon tetrachloride.

(5) WEATHERABILITY

Using a high pressure mercury lamp (a mercury lamp H400-P for photochemistry, electric source 100 V; a product of Tokyo Shibaura Electric Company), a film was placed at a position 20 cm away from a rod-like light source in parallel with it. The surface of the film was irradiated with light from the lamp for a predetermined period of time.

The mercury lamp used had the following operational characteristics.
Total length: 295 mm
Tube diameter: 18.5 mm
Power of the lamp: 400 W
Voltage of the lamp: 130 V
Current of the lamp: 3.3 A
Arc length: 150 mm
Brightness: 200 Cd/cm$^2$
Strongest spectrum: 365 Nm
Radiation limit: 220 Nm

(6) WEATHERABILITY (EXAMPLES 17 TO 22 AND COMPARATIVE EXAMPLES 12 TO 14)

Using a sunshine weather-ometer (Standard Sunshine Weather-ometer WE-Sun-DC, a product of Toyo Rika Kogyo Kabushiki Kaisha), a film specimen was irradiated at its surface for a predetermined period of time at a black panel temperature of 35° C. through a cycle consisting of 2-hour irradiation and 18-minute showering while it was rotated around a light source (Matsuda Sunshine Carbon) at a rate of 1 revolution per minute.

(7) LIGHT TRANSMITTANCE

It was measured after a film specimen was irradiated for a predetermined period of time with light of wavelength 500 m$\mu$ using the above spectro photometer.

(8) HEAT SHRINKAGE

Two indicator lines spaced from each other by a distance of 30 cm were provided on a film specimen. The film was exposed for 1 minute to hot air at 120° C. (80° C. in Comparative Example 5), and cooled to room temperature. Then, the distance between the indicator lines was measured. The heat shrinkage was calculated as the ratio (%) of decrease in the distance between the indicator lines from that before heating (30 cm).

(9) TEAR STRENGTH

Figure 1:
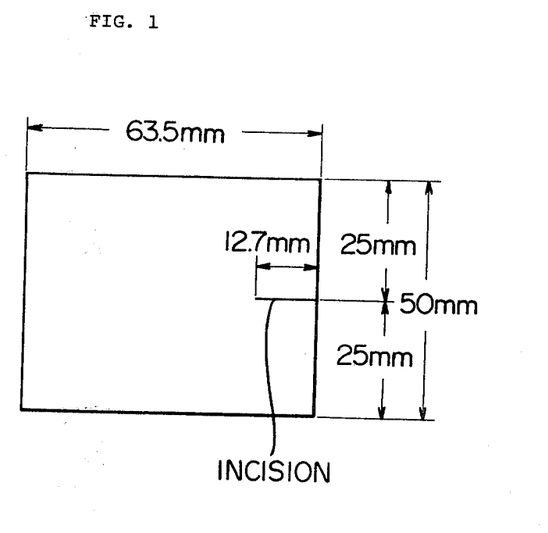
The accompanying drawing shows the shape and size of a film specimen used for measurement of tear strength.

In accordance with the method described in JIS P-8116, an incision was provided, as shown in the accompanying drawing, in a film specimen having a size of 63.5 mm (the tearing direction)×50 mm, and then torn off using a light load tear tester (a product of Toyo Seiki Seisakusho). The force (Kg) required to tear it off was measured, and converted to the force per unit thickness (mm). This force was defined as tear strength (Kg/mm).

(10) HAZE

Using an integrating sphere-type light transmittance measuring device, the amount of incident light ($T_1$), the total amount of light transmitted ($T_2$), the amount of light scattered by the device ($T_3$), and the amount of light scattered by the device and the test specimen ($T_4$) were measured. The haze was calculated in accordance with the following equation.

$$\text{Degree of cloudiness (haze)} = \frac{Td}{Tt} \times 100 \ (\%)$$

$$\text{wherein } Tt = \frac{T_2}{T_1} \times 100, \text{ and}$$

$$Td = \frac{T_4 - T_3(T_2/T_1)}{T_1} \times 100$$

(11) INTRINSIC VISCOSITY

Using o-chlorophenol as a solvent, it was measured at 35° C. The unit was 100 cc/g.

(12) FREQUENCY OF BREAKAGE

A film specimen was stretched continuously for a long time, and the number of breakages which occurred per 500,000 meters of the film length was measured.

(13) ANTI-FOGGING PROPERTY

Method of evaluation (I)

This is a test for anti-fog lasting properties. Water maintained at 50° C.±2° C. was placed in a constant-temperature water tank, and the tank was covered with a film coated with an anti-fog coating and inclined at an angle of 30 degrees so that the water tank was sealed. The time (hours) which elapsed until the anti-fogging effect of the film was lost partly was measured. The anti-fog lasting properties were expressed by the value obtained.

Method of evaluation (II)

This is a water resistance test. The surface of a film coated with an anti-fog coating (a square with a size of 50 cm×50 cm) was exposed to flowing water (about 4 liters/min. of city water) for 4 hours, and then subjected to the anti-fog lasting property test in method (I). The area of a portion which retained anti-fogging properties for 2 hours was measured, and the water resistance was calculated in accordance with the following equation.

$$\text{Water resistance} = \frac{\text{Area of a portion retaining anti-fogging property}}{\text{Surface area of the sample film}} \times 100 \ (\%)$$

The method (II) is more rigorous than the method (I), and serves to evaluate samples which cannot be differentiated by the method (I).

(14) COLOR

Using a digital color differential meter ND-101D (a product of Nippon Denshoku Kogyo Kabushiki Kaisha), the brightness (L value), the a value which shows red (+) and green (−), and the b value which shows yellow (+) and blue (−) were measured in accordance with JIS-P-8123.

(15) RESISTANCE TO HEAT DETERIORATION

A film specimen was aged at 145° C. for 150 days in a hot air circulating-type constant temperature tank (gear aging tester), and the elongation at break and strength at break of the film were measured. Based on these values, the resistance to heat deterioration of the film was evaluated.

(16) DUSTPROOFNESS

In order to express the amount of dust adhering to the surface of film, the light transmittance of a film specimen which had been exposed outdoors for 4 years and the light transmittance of that film after washing with ethanol were both measured. By comparing the two transmittance values, the dustproofness of the film was evaluated.

(17) OPTICAL DENSITY CHARACTERISTICS

The optical density of a film specimen within a wavelength region of 220 to 650 nm (220 to 650 mμ) was measured using a spectrophotometer (a multi-purpose autorecording spectrophotometer, MPS-5000, a product of Shimazu Seisakusho), and the ratio of the minimum value (A) of the optical density of the film in a wavelength region not greater than 325 mμ to the thickness (d) of the film (the thickness in centimeters obtained by dividing the weight of the film by the product of the surface area of the film multiplied by its density), that is, A/d (cm$^{-1}$), was measured, and defined as optical density characteristics. Since the optical density curve drawn by a polyethylene terephthalate film within a short wavelength region not greater than 325 mμ shows a minimum value at a wavelength of 325 mμ, if the ratio A/d at a wavelength of 325 mμ is at least 25 (cm$^{-1}$), this condition is met in the entire wavelength region below 325 mμ.

EXAMPLES 1 TO 4 AND COMPARATIVE EXAMPLES 1 AND 2

Ester-interchange and polycondensation of dimethyl terephthalate and ethylene glycol were performed using as a catalyst 40 millimole% of manganese acetate, 20 millimole% of antimony trioxide and 40 millimole% of phosphorous acid (the amounts being based on the dimethyl terephthalate) to afford polyethylene terephthalate having an intrinsic viscosity of 0.65.

The polyethylene terephthalate was dried at 170° C., melt-extruded at 280° C., and quenched and solidified on a casting drum held at 40° C. to afford an unstretched film having a thickness of 1,000 microns and an intrinsic viscosity of 0.61.

In Examples 1 to 3, the unstretched film was stretched in the machine direction at a stretch ratio of 3.1 and a temperature of 60° C., and successively in the transverse direction at a stretch ratio of 3.4 and a temperature of 60° C., and then heat-set for 10 seconds at each of the temperatures indicated in Table 1 to form a biaxially oriented polyethylene terephthalate film having a thickness of 100 microns.

On the other hand, in Comparative Example 1, the unstretched film was stretched in the machine direction at a stretch ratio of 3.1 and a temperature of 90° C., and successively in the transverse direction at a stretch ratio of 3.4 and a temperature of 110° C., and heat-set for 10 seconds at 210° C. to form a biaxially oriented film having a thickness of 100 microns.

In Example 4, an unstretched film was prepared under the same conditions as above from a mixture of the polyethylene terephthalate pellets dried at 170° C. and 0.3% by weight of an ultraviolet absorber (TINUVIN-320, trademark for a product of Ciba-Geigy, Switzerland), and then stretched and heat-set under the same conditions as in Examples 1 to 3.

In Comparative Example 2, the same unstretched film as prepared in Example 4 was stretched and heat-set under the same conditions as in Comparative Example 1.

The long period, crystal size, weatherability, and dustproofness of each of the resulting stretched films were measured, and the results are shown in Table 1.

TABLE 1

| | | | Examples | | | | Comparative Examples | |
|---|---|---|---|---|---|---|---|---|
| | | | 1 | 2 | 3 | 4 | 1 | 2 |
| Heat-setting temperature (°C.) | | | 150 | 140 | 125 | 128 | 210 | 210 |
| Refractive index | $n_x$ | | 1.6384 | 1.6347 | 1.6271 | 1.6288 | 1.6472 | 1.6475 |
| | $n_y$ | | 1.6370 | 1.6351 | 1.6370 | 1.6351 | 1.6493 | 1.6490 |
| | $n_z$ | | 1.4994 | 1.4999 | 1.5002 | 1.5063 | 1.4980 | 1.4987 |
| Density (g/cm$^3$) | | | 1.3823 | 1.3788 | 1.3741 | 1.3738 | 1.3995 | 1.3992 |
| Long period (A) | | | 135 | 120 | 115 | 115 | 155 | 153 |
| Crystal size | (010) plane (A) | | 43 | 32 | 23 | 22 | 50 | 51 |
| | (100) plane (A) | | 53 | 35 | 32 | 32 | 67 | 68 |
| Irradiation | Stretching direction | | MD* | MD* | MD* | MD* | MD* | MD* |
| by a high | Before | Elongation at break (%) | 127 | 124 | 120 | 131 | 134 | 132 |
| pressure | testing | Strength at break (kg/mm$^2$) | 24.1 | 23.7 | 23.5 | 20.7 | 21.0 | 21.7 |
| mercury | After exposure | Elongation at break (%) | 65 | 78 | 85 | 111 | 30 | 40 |
| lamp | for 25 hrs | Strength at break (kg/mm$^2$) | 15.9 | 18.3 | 19.1 | 20.1 | 12.3 | 12.9 |
| | After exposure | Elongation at break (%) | 48 | 69 | 80 | 130 | 4 | 13 |
| | for 50 hrs | Strength at break (kg/mm$^2$) | 13.6 | 16.8 | 19.4 | 24.3 | 9.5 | 10.7 |
| | After exposure | Elongation at break (%) | 32 | 56 | 75 | 134 | 6 | 13 |

TABLE 1-continued

|  |  |  | Examples | | | | Comparative Examples | |
|---|---|---|---|---|---|---|---|---|
|  |  |  | 1 | 2 | 3 | 4 | 1 | 2 |
|  | for 100 hrs | Strength at break (kg/mm²) | 12.5 | 15.7 | 17.8 | 18.8 | 7.3 | 9.6 |
| Dust | Before testing (%) |  | 90.8 | 90.7 | 90.7 | 90.4 | 90.9 | 90.2 |
| proof- | After outdoor | Before washing (%) | 84.7 | 85.1 | 85.5 | 85.5 | 60.7 | 62.0 |
| ness | exposure | After washing (%) | 89.7 | 90.0 | 90.1 | 90.1 | 79.5 | 81.3 |

*machine direction

The results shown in Table 1 demonstrate that the films in accordance with this invention have superior dustproofness, and even after exposure to light from a high pressure mercury lamp for 100 hours, retain more than 50% of their initial strength before exposure, but that the films outside the scope of this invention have poor dustproofness, and their strength decreases remarkably upon exposure.

a monoaxially oriented film having a thickness of 100 microns.

The weatherability of these monoaxially oriented films was measured, and the results are shown in Table 2.

TABLE 2

|  |  |  | Example 5 | Example 6 | Comparative Example 3 |
|---|---|---|---|---|---|
| Heat-setting temperature (°C.) |  |  | 150 | 125 | 210 |
| Refractive index | $n_x$ |  | 1.6829 | 1.6608 | 1.6967 |
|  | $n_z$ |  | 1.5256 | 1.5395 | 1.5234 |
| Density (g/cm³) |  |  | 1.3844 | 1.3769 | 1.3966 |
| Irradiation | Stretching direction |  | MD | MD | MD |
| by a high | Before testing | Elongation at break (%) | 95.2 | 100.3 | 93.2 |
| pressure |  | Strength at break (kg/mm²) | 24.1 | 23.7 | 22.9 |
| mercury | After exposure for 25 hrs | Elongation at break (%) | 62 | 87 | 33 |
| lamp |  | Strength at break (kg/mm²) | 16.6 | 21.8 | 11.9 |
|  | After exposure for 50 hrs. | Elongation at break (%) | 49 | 83 | 4 |
|  |  | Strength at break (kg/mm²) | 14.8 | 20.8 | 9.1 |
|  | After exposure for 100 hrs. | Elongation at break (%) | 33 | 78 | 6 |
|  |  | Strength at break (kg/mm²) | 13.1 | 18.9 | 7.1 |

EXAMPLES 5 AND 6 AND COMPARATIVE EXAMPLE 3

Ester-interchange and polycondensation of dimethyl terephthalate and ethylene glycol were performed using as a catalyst 40 millimole% of manganese acetate, 20 millimole% of antimony trioxide and 40 millimole% of phosphorous acid (the amounts being based on the dimethyl terephthalate) to afford polyethylene terephthalate having an intrinsic viscosity of 0.65.

The polyethylene terephthalate was dried at 170° C., melt-extruded at 280° C., and quenched and solidified on a casting drum held at 40° C. to afford an unstretched film having a thickness of 320 microns and an intrinsic viscosity of 0.61.

In Examples 5 and 6, the unstretched film was stretched in the machine direction at a stretch ratio of 3.2 and a temperature of 60° C. while restraining it in the transverse direction, and heat-set for 30 seconds at each of the temperatures shown in Table 2 to afford a monoaxially oriented film having a thickness of 100 microns.

In Comparative Example 3, the unstretched film was stretched in the machine direction at a stretch ratio of 3.2 and a temperature of 90° C. while restraining it in the transverse direction, and heat-set at 210° C. to afford

EXAMPLES 7 AND 8 AND COMPARATIVE EXAMPLES 4 AND 5

Chips of polyethylene terephthalate having an intrinsic viscosity of 0.65 were dried, and melt-extruded in a customary manner to afford an unstretched film having a thickness of 1,100 microns.

The unstretched film was stretched in the machine direction at a stretch ratio of 3.2 and a temperature of 65° C., and successively in the transverse direction at a stretch ratio of 3.4 and a temperature of 65° C., and then heat-set for 10 seconds at each of the temperatures shown in Table 3 to afford a biaxially oriented film having a thickness of 100 microns (Examples 7 and 8).

For comparison, the above unstretched film was stretched in the machine direction at a stretch ratio of 3.2 and a temperature of 90° C. and then in the transverse direction at a stretch ratio of 3.4 and a temperature of 110° C., and then heat-set for 10 seconds at 210° C. to afford a biaxially oriented film having a thickness of 100 microns (Comparative Examples 4).

These biaxially oriented films (Examples 7 and 8 and Comparative Example 4) and a commercially available biaxially oriented film of hard polyvinyl chloride of 100 microns in thickness which is generally used for greenhouses (Comparative Example 5) were tested for haze, heat shrinkage and weatherability. The results are shown in Table 3.

TABLE 3

|  |  |  | Example 7 | | Example 8 | | Comparative Example 4 | | Comparative Example 5 | |
|---|---|---|---|---|---|---|---|---|---|---|
| Heat-setting temperature (°C.) |  |  | 150 | | 125 | | 210 | | Hard poly- | |
| Density (g/cm³) |  |  | 1.3816 | | 1.3733 | | 1.3990 | | vinyl chlo-ride film | |
| Haze |  |  | 0.50 | | 0.52 | | 0.48 | | 2.00 | |
| Stretching direction |  |  | MD*1 | TD*2 | MD | TD | MD | TD | MD | TD |
| Heat shrinkage (%) |  |  | 4.01 | 6.31 | 11.1 | 24.2 | 1.00 | 1.50 | 31.2 | 23.4 |
| Irradiation | Before testing | Elongation at break (%) | 124 | 143 | 121 | 127 | 132 | 150 | 110 | 128 |

TABLE 3-continued

|  |  |  | Example 7 | | Example 8 | | Comparative Example 4 | | Comparative Example 5 | |
|---|---|---|---|---|---|---|---|---|---|---|
| by a high pressure mercury lamp |  | Strength at break (kg/mm²) | 24.6 | 19.9 | 23.7 | 22.1 | 23.3 | 19.1 | 11.0 | 7.54 |
|  | After exposure for 25 hours | Elongation at break (%) | 62 | 75 | 80 | 85 | 35 | 40 | 37 | 40 |
|  |  | Strength at break (kg/mm²) | 16.2 | 15.7 | 18.7 | 18.1 | 12.0 | 10.8 | 6.8 | 6.1 |
|  | After exposure for 50 hours | Elongation at break (%) | 47 | 53 | 81 | 83 | 5 | 6 | 7 | 6 |
|  |  | Strength at break (kg/mm²) | 12.8 | 11.9 | 19.1 | 18.5 | 9.4 | 8.6 | 7.4 | 6.9 |
|  | After exposure for 100 hours | Elongation at break (%) | 33 | 35 | 77 | 80 | 4 | 3 | — | — |
|  |  | Strength at break (kg/mm²) | 12.1 | 11.8 | 17.5 | 16.8 | 7.5 | 6.1 | — | — |
| Light transmittance (%) | Before exposure | | 90.5 | | 90.3 | | 90.0 | | 90.2 | |
|  | After exposure for 500 hours | | 90.0 | | 90.2 | | 89.0 | | 89.0 | |
|  | After exposure for 1000 hours | | 89.5 | | 90.0 | | 86.2 | | 66.8 | |
|  | After exposure for 1500 hours | | 87.0 | | 89.0 | | 79.0 | | —*3 | |

*[1] Machine direction
*[2] Transverse direction
*[3] Not measurable because the film became crumbled The above results demonstrate that the films having a density of not more than 1.390 g/cm³ as used in this invention have far superior weatherability to films having a density outside this range in a weatherability test using a high pressure mercury lamp.

When each of the films obtained in Examples 7 and 8 was stretched over a distance of 10 meters on a greenhouse framework consisting of metallic frames spaced from each other by a distance of 50 cm, it was not kept completely taut, and loosening remained. Thus, the length of the film had to be about 2% larger than the actual length. After stretching, the greenhouse was exposed to sunlight. After one day's exposure, the loosening of the film decreased markedly, and the film was kept completely taut. As a result, the film did not flutter under the influence of rain, wind, etc., and nor did it break for more than one year.

On the other hand, in a greenhouse using the flm of Comparative Example 4, loosening remained, and the film was not kept taut. The film fluttered when there was rain or wind, etc., and broke in about 3 months at the earliest.

EXAMPLES 9 TO 11

Ester-interchange and polycondensation of dimethyl terephthalate and ethylene glycol were performed using as a catalyst 40 millimole% of manganese acetate, 20 millimole% of antimony trioxide and 40 millimole% of phosphorous acid to afford polyethylene terephthalate having an intrinsic viscosity of 0.63 (Example 9), 0.69 (Example 10), and 0.75 (Example 11).

The polyethylene terephthalate was dried at 170° C., melt-extruded at 280° C., and quenched and solidified on a casting drum held at 40° C. to afford an unstretched film having a thickness of 1,100 microns, and an intrinsic viscosity of 0.60 (Example 9), 0.65 (Example 10), and 0.71 (Example 11).

The unstretched film was stretched in the machine direction at a stretch ratio of 3.2 and a temperature of 60° C., and successively in the transverse direction at a stretch ratio of 3.5 and a temperature of 60° C., and then heat-set for 10 seconds at each of the temperatures shown in Table 4 to afford a biaxially oriented film having a thickness of 100 microns.

The results obtained are shown in Table 4.

TABLE 4

|  |  |  | Example 9 | | Example 10 | | Example 11 | |
|---|---|---|---|---|---|---|---|---|
| Intrinsic viscosity of the film | | | 0.60 | | 0.65 | | 0.71 | |
| Frequency of breakage during stretch (times/500,000 meters) | | | 1-2 | | 0-1 | | 0-1 | |
| Heat-setting temperature (°C.) | | | 150 | 125 | 150 | 125 | 150 | 125 |
| Refractive index | $n_x$ | | 1.6137 | 1.6056 | 1.6116 | 1.6003 | 1.6066 | 1.5956 |
|  | $n_y$ | | 1.6764 | 1.6753 | 1.6711 | 1.6703 | 1.6681 | 1.6661 |
|  | $n_z$ | | 1.5175 | 1.5183 | 1.5213 | 1.5245 | 1.5046 | 1.5274 |
| Density (g/cm³) | | | 1.3835 | 1.3754 | 1.3819 | 1.3737 | 1.3803 | 1.3722 |
| Haze (%) | | | 0.81 | 0.83 | 0.61 | 0.59 | 0.34 | 0.30 |
| Irradiation by high pressure mercury lamp | Stretching direction | | MD | MD | MD | MD | MD | MD |
|  | Before testing | Elongation at break (%) | 128 | 120 | 132 | 125 | 120 | 116 |
|  |  | Strength at break (kg/mm²) | 24.2 | 23.7 | 25.3 | 24.9 | 29.8 | 30.4 |
|  |  | Tear strength (kg/mm) | 1.77 | 1.74 | 1.84 | 1.88 | 1.91 | 1.94 |
|  | After exposure for 25 hours | Elongation at break (%) | 66 | 83 | 70 | 92 | 74 | 95 |
|  |  | Strength at break (kg/mm²) | 16.5 | 19.6 | 17.3 | 19.5 | 21.3 | 26.0 |
|  | After exposure for 50 hours | Elongation at break (%) | 47 | 81 | 56 | 90 | 59 | 93 |
|  |  | Strength at break (kg/mm²) | 14.6 | 19.7 | 15.3 | 19.9 | 19.8 | 24.3 |
|  | After exposure for 100 hours | Elongation at break (%) | 37 | 78 | 38 | 80 | 42 | 86 |
|  |  | Strength at break (kg/mm²) | 13.1 | 17.9 | 14.6 | 18.8 | 18.5 | 21.8 |
|  |  | Tear strength (kg/mm) | 0.97 | 1.09 | 1.27 | 1.35 | 1.41 | 1.46 |

The above results show that the films in accordance with this invention, even after being exposed to light from a high pressure mercury lamp for 100 hours, retain more than 50% of their initial strength before exposure, and have low breakage frequency in film-formation.

COMPARATIVE EXAMPLES 6 AND 7

In the same way as in Examples 9 to 11, polyethylene terephthalate chips having an intrinsic viscosity of 0.60 (Comparative Example 6) and 0.69 (Comparative Example 7) were prepared, and melt-extruded in the same way as in Examples 9 to 11 to afford unstretched films having a thickness of 1,100 microns and an intrinsic viscosity of 0.52 (Comparative Example 6) and 0.65 (Comparative Example 7).

Each of the unstretched films was stretched in the machine direction at a stretch ratio of 3.2 and a temperature of 90° C. and successively in the transverse direction at a stretch ratio of 3.5 and a temperature of 110° C., and then heat-set for 10 seconds at each of the temperatures shown in Table 5 to afford biaxially oriented films having a thickness of 100 microns.

The results obtained are shown in Table 5.

3.2 and a temperature of 90° C. and successively in the transverse direction at a stretch ratio of 3.4 and a temperature of 110° C., and then heat-set for 10 seconds at 210° C. to form a biaxially oriented film having a thickness of 100 microns.

These biaxially oriented films were tested for heat shrinkage (after heating at 120° C. for 1 minute) and weatherability. The results are shown in Table 6.

TABLE 6

|  |  |  | Example 12 | | Example 13 | | Comparative Example 8 | |
|---|---|---|---|---|---|---|---|---|
| Heat-setting temperature (°C.) | | | 150 | | 125 | | 210 | |
| Density (g/cm³) | | | 1.3816 | | 1.3733 | | 1.3990 | |
| Stretching direction | | | MD | TD | MD | TD | MD | TD |
| Heat shrinkage (%) | | | 4.01 | 6.31 | 11.1 | 24.2 | 1.00 | 1.50 |
| Irradiation by a high pressure mercury lamp | Before testing | Elongation at break (%) | 124 | 143 | 121 | 127 | 132 | 150 |
| | | Strength at break (kg/mm²) | 24.6 | 19.9 | 23.7 | 22.1 | 23.3 | 19.1 |
| | After exposure for 25 hours | Elongation at break (%) | 62 | 75 | 80 | 85 | 35 | 40 |
| | | Strength at break (kg/mm²) | 16.2 | 15.7 | 18.7 | 18.1 | 12.0 | 10.8 |
| | After exposure for 50 hours | Elongation at break (%) | 47 | 53 | 81 | 83 | 5 | 6 |
| | | Strength at break (kg/mm²) | 12.8 | 11.9 | 19.1 | 18.5 | 9.4 | 8.6 |
| | After exposure for 100 hours | Elongation at break (%) | 33 | 35 | 77 | 80 | 4 | 3 |
| | | Strength at break (kg/mm²) | 12.1 | 11.8 | 17.5 | 16.8 | 7.5 | 6.1 |

The results shown in Table 6 demonstrate that the films used in this invention which have a density of not

TABLE 5

|  |  |  | Comparative Example 6 | | Comparative Example 7 |
|---|---|---|---|---|---|
| Intrinsic viscosity of the film | | | 0.52 | | 0.65 |
| Frequency of breakage during stretch (times/500,000 meters) | | | 8–10 | | 0–1 |
| Heat-setting temperature (°C.) | | | 150 | 125 | 210 |
| Refractive index | $n_x$ | | 1.6167 | 1.6096 | 1.6193 |
| | $n_y$ | | 1.6791 | 1.6776 | 1.6817 |
| | $n_z$ | | 1.5154 | 1.5167 | 1.5182 |
| Density (g/cm³) | | | 1.3842 | 1.3771 | 1.3996 |
| Haze (%) | | | 2.26 | 2.31 | 0.98 |
| Irradiation by a high pressure mercury lamp | Stretching direction | | MD | MD | MD |
| | Before testing | Elongation at break (%) | 136 | 133 | 141 |
| | | Strength at break (kg/mm²) | 22.7 | 22.1 | 24.5 |
| | | Tear strength (kg/mm) | 0.51 | 0.49 | 1.36 |
| | After exposure for 25 hours | Elongation at break (%) | 57 | 61 | 31 |
| | | Strength at break (kg/mm²) | 13.3 | 15.8 | 13.1 |
| | After exposure for 50 hours | Elongation at break (%) | 35 | 57 | 5 |
| | | Strength at break (kg/mm²) | 12.5 | 15.1 | 8.5 |
| | After exposure for 100 hours | Elongation at break (%) | 18 | 35 | 4 |
| | | Strength at break (kg/mm²) | 11.5 | 12.8 | 7.1 |
| | | Tear strength (kg/mm) | 0.28 | 0.25 | 0.61 |

The above results show that films having an intrinsic viscosity lower than that specified in the present invention have an exceedingly great haze value, and films having a density higher than that specified in this invention have poor weatherability.

EXAMPLES 12 AND 13 COMPARATIVE EXAMPLE 8

Polyethylene terephthalate chips having an intrinsic viscosity of 0.65 were dried, and melt-extruded in a customary manner to form unstretched films each having a thickness of 1,100 microns.

In Examples 12 and 13, the unstretched film was stretched in the machine direction at a stretch ratio of 3.2 and a temperature of 65° C. and successively in the transverse direction at a stretch ratio of 3.4 and a temperature of 65° C., and then heat-set for 10 seconds at each of the temperatures shown in Table 6 to afford a biaxially oriented film having a thickness of 100 microns.

In Comparative Example 8, the unstretched film was stretched in the machine direction at a stretch ratio of more than 1.390 g/cm³ have far superior weatherability to films having a density outside the specified range in a weather-ability test using a high pressure mercury lamp.

The surface of each of the biaxially oriented films was subjected to corona discharge, and coated by a gravure roll coater in a dry amount of 0.4 g/m² with a treating solution which had been prepared by adding 2% by weight of a nonionic surface active agent (NS-210, a product of Nippon Yushi Kabushiki Kaisha) to a 1% by weight aqueous solution of polyvinyl alcohol having a saponification degree of 98.5±0.5 mole%. While bringing the uncoated surface into contact with a drum surface kept at 40° C., the coated surface was dried by hot air at 100° C. for 3 minutes. The resulting films were tested for anti-fog lasting properties and water resistance, and the results obtained are shown in Table 7.

TABLE 7

|  | Example 12 | Example 13 | Comparative Example 8 |
|---|---|---|---|
| Heat-setting temperature (°C.) | 150 | 125 | 210 |

TABLE 7-continued

|  | Example 12 | Example 13 | Comparative Example 8 |
|---|---|---|---|
| Density (g/cm³) | 1.3816 | 1.3733 | 1.3990 |
| Anti-fog lasting property (hours) | 850 | 1,100 | 150 |
| Water resistance (%) | 93 | 98 | 40 |

From the results shown in Table 7, it is seen that the anti-fog lasting property and water resistance of the films in accordance with this invention are far superior to those of films outside the scope of this invention.

Each of the films treated with an anti-fog coating in Examples 12 and 13 was stretched over a distance of 10 meters on a greenhouse framework consisting of metallic frames spaced from each other by a distance at 50 cm, it was not kept completely taut, but loosening remained. Thus, the length of the film had to be about 2% larger than the actual length. After stretching, the greenhouse was exposed to sunlight. After one day's exposure, the loosening of the film decreased markedly, and the film was kept completely taut. As a result, the film did not flutter by the influence of rain, wind, etc., nor did it break for more than one year. During this time, the anti-fogging property of the film was not destroyed.

On the other hand, in a greenhouse using the film of Comparative Example 8, loosening remained, and the film was not kept taut. The film fluttered when there was rain or wind, etc., and broke in about 3 months. The anti-fogging property of the film was reduced considerably in about 3 months.

EXAMPLES 14 to 16 AND COMPARATIVE EXAMPLES 9 to 11

100 Parts by weight of dimethyl terephthalate and 70 parts by weight of ethylene glycol were melted in an oxygen-free nitrogen atmosphere, and at a temperature of 150° C., a solution of 0.05 part by weight of manganese acetate tetrahydrate and 0.018 part by weight (Example 14), 0.036 part by weight (Example 15), 0.072 part by weight (Example 16), or 0.090 part by weight (Comparative Example 9) of antimony trioxide in 1 part by weight of ethylene glycol was added. Then, the ester-interchange reaction between dimethyl terephthalate and ethylene glycol was carried out at 220° C. for about 3 hours, and methanol was distilled off. After the reaction, 0.029 part by weight of trimethyl phosphite was added, and the temperature of the reaction mixture was raised to 285° C. as rapidly as possible. At this temperature and a pressure of less than 1 mmHg, the polycondensation reaction was performed for about 6 hours (Example 14), about 3 hours (Example 15), about 1 hour (Example 16), or about 0.6 hour (Comparative Example 9) to afford polyethylene terephthalate having an intrinsic viscosity of 0.65. The polyethylene terephthalate had an antimony content of 0.015% by weight (Example 14), 0.03% by weight (Example 15), 0.06% by weight (Example 16), or 0.075% by weight (Comparative Example 9).

For comparison, the same ester-interchange and polycondensation as in Example 15 were carried out except that 0.01 part by weight of germanium dioxide was used instead of 0.036 part by weight of antimony trioxide to afford polyethylene terephthalate having an intrinsic viscosity of 0.65 (Comparative Example 10).

Each of these polyethylene terephthalates was dried at 170° C., melt-extruded at 280° C., and quenched and solidified on a casting drum held at 40° C. to afford an unstretched film having a thickness of 1,100 microns.

Each of the unstretched films was stretched in the machine direction at a stretch ratio of 3.2 and a temperature of 60° C. and successively in the transverse direction at a stretch ratio of 3.5 and a temperature of 60° C., and then heat-set for 10 seconds at each of the temperatures shown in Table 8 to afford a biaxially oriented film having a thickness of 100 microns.

In Comparative Example 11, the same polymer as in Example 15 was used to prepare an unstretched film in the same way as in Example 15. The unstretched film was stretched in the machine direction at a stretch ratio of 3.2 and a temperature of 90° C. and successively in the transverse direction at a stretch ratio of 3.5 and a temperature of 110° C., and then heat-set for 10 seconds at the temperature shown in Table 8 to afford a biaxially oriented film having a thickness of 100 microns.

The results obtained are shown in Table 8.

TABLE 8

|  |  |  | Example 14 | Example 15 |  | Example 16 | Comparative Example 9 | Comparative Example 10 | Comparative Example 11 |
|---|---|---|---|---|---|---|---|---|---|
| Heat-setting temperature (°C.) |  |  | 150 | 150 | 125 | 150 | 150 | 150 | 210 |
| Color | L |  | 85.3 | 83.9 |  | 77.3 | 71.6 | 88.3 | 83.9 |
|  | a |  | 0 | 0 |  | 0 | 0 | −0.3 | 0 |
|  | b |  | +3.3 | +3.5 |  | +3.3 | +3.0 | +3.7 | +3.8 |
| Refractive index | $n_x$ |  | 1.6137 | 1.6137 | 1.6056 | 1.6133 | 1.6134 | 1.6133 | 1.6191 |
|  | $n_y$ |  | 1.6764 | 1.6765 | 1.6753 | 1.6758 | 1.6758 | 1.6760 | 1.6820 |
|  | $n_z$ |  | 1.5175 | 1.5179 | 1.5183 | 1.5179 | 1.5171 | 1.5173 | 1.5161 |
| Density (g/cm³) |  |  | 1.3835 | 1.3828 | 1.3749 | 1.3826 | 1.3831 | 1.3833 | 1.3993 |
| Irradiation | Stretching direction |  | MD | MD | MD | MD | MD | MD | MD |
| by a high | Before | Elongation at break (%) | 129 | 130 | 121 | 127 | 135 | 129 | 145 |
| pressure | testing | Strength at break (kg/mm²) | 24.5 | 24.5 | 22.9 | 24.0 | 24.3 | 23.5 | 24.3 |
| mercury | After exposure for | Elongation at break (%) | 67 | 63 | 80 | 67 | 60 | 58 | 30 |
| lamp | 25 hours | Strength at break (kg/mm²) | 16.5 | 15.8 | 18.9 | 16.6 | 15.9 | 15.6 | 13.0 |
|  | After exposure for | Elongation at break (%) | 45 | 40 | 75 | 49 | 43 | 40 | 5 |
|  | 50 hours | Strength at break (kg/mm²) | 14.8 | 14.1 | 18.5 | 15.6 | 14.1 | 13.9 | 8.3 |
|  | After exposure for | Elongation at break (%) | 37 | 32 | 72 | 40 | 33 | 30 | 4 |
|  | 100 hours | Strength at break (kg/mm²) | 13.4 | 12.5 | 16.8 | 13.5 | 12.5 | 12.0 | 7.3 |
| Resistance to |  | Elongation at break (%) | 48 | 46 | 46 | 32 | 27 | 6 | 25 |
| heat deterioration |  | Strength at break (kg/mm²) | 14.5 | 14.0 | 14.0 | 11.9 | 10.3 | 8.1 | 10.3 |
| Dust-proofness |  | Before testing | 91.0 | 90.5 | 90.5 | 88.8 | 83.1 | 92.5 | 90.7 |

TABLE 8-continued

|  |  |  | Example 14 | Example 15 | | Example 16 | Comparative Example 9 | Comparative Example 10 | Comparative Example 11 |
|---|---|---|---|---|---|---|---|---|---|
| (light transmittance) | After outdoor exposure | before washing (%) | 80.5 | 86.9 | 87.0 | 78.3 | 72.3 | 59.5 | 75.3 |
|  |  | after washing (%) | 90.4 | 94.6 | 95.7 | 90.7 | 84.0 | 77.8 | 88.0 |

The above results demonstrate that the films in accordance with this invention have superior color, retain more than 50% of their initial strength after exposure to light from a high pressure mercury lamp for 100 hours, and also have superior resistance to heat deterioration and dustproofness.

EXAMPLES 17 TO 22 AND COMPARATIVE EXAMPLES 12 TO 14

Ester-interchange and polycondensation of dimethyl terephthalate and ethylene glycol were performed using as a catalyst 40 millimole% of manganese acetate, 20 millimole% of antimony trioxide and 40 millimole% of phosphorous acid to afford polyethylene terephthalate having an intrinsic viscosity of 0.65.

The resulting polyethylene terephthalate was dried at 170° C., and dry-blended with each of the ultraviolet absorbents shown in Table 9 in each of the amounts indicated in the same table. The blend was melt-extruded at 280° C., and quenched and solidified on a casting drum held at 40° C. to afford an unstretched film having a thickness of 1.050μ.

In Examples 17 to 22, the unstretched film was stretched in the machine direction at a stretch ratio of 3.1 and a temperature of 60° C. and successively in the transverse direction at a stretch ratio of 3.4 and a temperature of 60° C., and then heat-set for 10 seconds at each of the temperatures shown in Table 9 to afford a biaxially oriented film having a thickness of 100 microns.

In Comparative Example 12, an unstretched polyethylene terephthalate film having a thickness of 1,050 microns obtained in the same way as in Examples 17 to 22, except that no ultraviolet absorber was incorporated, was stretched under the same conditions as in Examples 17 to 22, and then heat-set for 10 seconds at 125° C. In Comparative Examples 13 and 14, an unstretched film having a thickness of 1,050 microns obtained in the same way as in Examples 17 to 22 was stretched in the machine direction at a stretch ratio of 3.1 and a temperature of 90° C. and successively in the transverse direction at a stretch ratio of 3.4 and a temperature of 110° C. to afford a biaxially oriented film having a thickness of 100 microns.

These stretched films were tested for weatherability, and the results are shown in Table 9.

TABLE 9

|  | Ultraviolet absorber | | Heat-setting temp. (°C.) | Properties of the film | | | | | |
|---|---|---|---|---|---|---|---|---|---|
|  |  |  |  | Density (g/cm$^3$) | A/D (cm$^{-1}$) | Strength and elongation | | | Exposure time* (hr) |
|  | Type | Amount (wt. %) |  |  |  | Stretching direction | Elongation at break (%) | Strength at break (kg/mm$^2$) |  |
| Example 17 | 2,2',4,4'-tetrahydroxybenzophenone | 1.0 | 150 | 1.3825 | 500 | MD | 169 | 18.9 | 4000 |
| Example 18 | 2,2',4,4'-tetrahydroxybenzophenone | 1.0 | 125 | 1.3752 | 500 | MD | 131 | 20.7 | 4300 |
| Example 19 | 2,2',4,4'-tetrahydroxybenzophenone | 0.5 | 125 | 1.3755 | 250 | MD | 135 | 23.1 | 3900 |
| Example 20 | 2,2',4,4'-tetrahydroxybenzophenone | 0.1 | 125 | 1.3756 | 50 | MD | 130 | 23.0 | 3600 |
| Example 21 | 2,2',4,4'-tetrahdyroxybenzophenone | 0.05 | 125 | 1.3761 | 25 | MD | 123 | 23.3 | 3400 |
| Example 22 | 2,4-dihydroxybenzophenone | 1.0 | 125 | 1.3760 | 700 | MD | 133 | 19.1 | 4100 |
| Comparative Example 12 | — | — | 125 | 1.3770 | 20 | MD | 120 | 23.5 | 1900 |
| Comparative Example 13 | — | — | 210 | 1.3992 | 20 | MD | 133 | 21.0 | 700 |
| Comparative Example 14 | 2,2',4,4'-tetrahydroxybenzophenone | 0.05 | 210 | 1.3990 | 500 | MD | 169 | 21.8 | 1000 |

*The time of exposure by a sunshine weather-ometer required until the residual strength of the film in the machine direction becomes 50%.

The following conclusion can be drawn from the data given in Table 9.

In the case of an ordinary polyethylene terephthalate film having a density larger than 1.390 and not containing an ultraviolet absorber (Comparative Example 13), the time of exposure by a sunshine weather-ometer which is required until the residual strength of the film in the machine direction is decreased to 50% is 700 hours. In contrast, in the case of an ordinary polyethylene terephthalate film having a density larger than 1.390 and containing 0.05% of 2,2',4,4'-tetrahydroxybenzophenone as an ultraviolet absorber (Comparative Example 14), the exposure time is 1,000 hours. Accordingly, in ordinary polyethylene terephthalate films having a density larger than 1.390, the prolongation of the exposure time by 300 hours can be recognized as an effect of adding an ultraviolet absorber.

On the other hand, in the case of the polyethylene terephthalate film in accordance with this invention which has a density smaller than 1.390 and an A/d value of 20 (Comparative Example 12), the exposure time is 1,900 hours. In contrast, in the case of the polyethylene terephthalate film in accordance with this invention which contains 0.05% of 2,2',4,4'-tetrahydroxybenzophenone as an ultraviolet absorber and has an A/d value of 25 and a density of 1,390 (Example 21), the exposure time is 3,400 hours. Accordingly, in polyethylene terephthalate films in accordance with this invention which have a density smaller than 1.390, the prolongation of the exposure time by 1,500 hours can be recognized as an effect of adding an ultraviolet absorber. It can be seen from the above results that when an ultraviolet absorber is added to the polyethylene terephthalate film used in this invention to adjust its A/d value to at least 25, a remarkable synergistic effect can be brought about in regard to its weatherability.

What we claim is:
1. In a greenhouse for protecting plants from weather exposure, including a framework and a single layer of polyethylene terephthalate film stretched over the framework, the improvement wherein said polyethylene terephthalate film is a biaxially oriented film having:
   a refractive index in the oriented direction of 1.59–1.75,
   a refractive index in the thickness direction of 1.485–1.56,
   a density of 1.350–1.382 g/cm$^3$,
   an intrinsic viscosity of 0.52–0.71, and
   a thickness of 50–500 microns.

* * * * *